US009861938B2

(12) United States Patent
Uda et al.

(10) Patent No.: US 9,861,938 B2
(45) Date of Patent: Jan. 9, 2018

(54) SPIRAL-WOUND FORWARD OSMOSIS MEMBRANE ELEMENT AND FORWARD OSMOSIS MEMBRANE MODULE

(71) Applicant: NITTO DENKO CORPORATION, Ibaraki-shi, Osaka (JP)

(72) Inventors: Yasuhiro Uda, Osaka (JP); Makoto Kobuke, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 436 days.

(21) Appl. No.: 14/414,040

(22) PCT Filed: Jul. 23, 2013

(86) PCT No.: PCT/JP2013/004470
§ 371 (c)(1),
(2) Date: Jan. 9, 2015

(87) PCT Pub. No.: WO2014/017076
PCT Pub. Date: Jan. 30, 2014

(65) Prior Publication Data
US 2015/0157984 A1    Jun. 11, 2015

(30) Foreign Application Priority Data

Jul. 25, 2012 (JP) ................. 2012-164894

(51) Int. Cl.
*B01D 63/10* (2006.01)
*C02F 1/44* (2006.01)
*B01D 61/00* (2006.01)

(52) U.S. Cl.
CPC ........... *B01D 63/103* (2013.01); *B01D 63/10* (2013.01); *C02F 1/445* (2013.01); *B01D 61/002* (2013.01);
(Continued)

(58) Field of Classification Search
CPC .... B01D 61/002; B01D 61/005; B01D 63/10; B01D 63/103; B01D 63/106; B01D 63/12;
(Continued)

(56) References Cited

U.S. PATENT DOCUMENTS 4,033,878 A    7/1977 Foreman et al.
4,765,893 A *  8/1988 Kohlheb ............ B01D 63/103
                                            210/315
(Continued)

FOREIGN PATENT DOCUMENTS

JP    51-024587    2/1976
JP    1-115410     5/1989
(Continued)

*Primary Examiner* — Pranav N Patel
(74) *Attorney, Agent, or Firm* — Hamre, Schumann, Mueller & Larson, P.C.

(57) ABSTRACT

A spiral-wound forward osmosis membrane element (2) includes: a membrane leaf (23) in which an internal flow path extending from a first opening (26A) to a second opening (26B) is formed; and a central tube (31) around which the membrane leaf (23) is wound and which has a feed hole (31A) communicating with the first opening (26A) and a collection hole (31B) communicating with the second opening (26B). The central tube (31) has an interior partitioned to include an inflow region (3A) communicating with the feed hole (31A) and an outflow region (3B) communicating with the collection hole (31B) so that the inflow region (3A) and the outflow region (3B) each form a flow path extending continuously in an axial direction of the central tube (31) from one end to the other end of the central tube (3). Since a liquid fed into the inflow region (3A) is discharged to the outside without passing through two or more internal flow paths (26), the pressure loss in the spiral-wound forward osmosis membrane element (2) is reduced. Thereby, it is possible to provide a spiral-wound (Continued)

forward osmosis membrane element in which the pressure loss of the flow of a fluid is reduced.

11 Claims, 7 Drawing Sheets

(52) U.S. Cl.
CPC .... *B01D 2313/086* (2013.01); *B01D 2313/10* (2013.01); *B01D 2313/12* (2013.01)

(58) Field of Classification Search
CPC ............ B01D 2323/10; B01D 2323/12; B01D 2323/086; C02F 1/445
See application file for complete search history.

(56) References Cited

U.S. PATENT DOCUMENTS

2007/0272628 A1* 11/2007 Mickols ............... B01D 61/025
                                                      210/790
2010/0224550 A1*  9/2010 Herron .................. B01D 63/12
                                                      210/321.74

FOREIGN PATENT DOCUMENTS

| JP | 2003-176775 | 6/2003 |
| JP | 2005-279540 | 10/2005 |
| WO | 2009/151709 | 12/2009 |
| WO | 2010/104895 | 9/2010 |
| WO | 2011/072277 | 6/2011 |

\* cited by examiner

SPIRAL-WOUND FORWARD OSMOSIS MEMBRANE ELEMENT AND FORWARD OSMOSIS MEMBRANE MODULE

TECHNICAL FIELD

The present invention relates to a spiral-wound forward osmosis membrane element and a spiral-wound forward osmosis membrane module loaded with this spiral-wound forward osmosis membrane element.

BACKGROUND ART

There are conventionally known techniques for applying forward osmosis phenomenon to wastewater treatment, seawater desalination, osmotically-induced power generation, etc. For example, there is a known method of using a forward osmosis membrane for seawater desalination to dilute concentrated seawater that has been concentrated in a seawater desalination process (see, for example, Patent Literature 1). There is also a known power generation system, in which dilution water such as lower concentration seawater or freshwater is caused to penetrate, through a semi-permeable membrane, concentrated seawater that has been produced simultaneously with seawater desalination using a reverse osmosis membrane in a seawater desalination device, the flow rate of the concentrated seawater is increased by the positive osmotic pressure energy of the dilution water, and thereby power is generated using the increased flow rate of the concentrated seawater (see, for example, Patent Literature 2). There is also a known spiral-wound forward osmosis membrane element used for these systems using the forward osmosis phenomenon (see, for example, Patent Literature 3).

In a spiral-wound forward osmosis membrane element, a liquid moves from a lower concentration (lower osmotic pressure) solution to a higher concentration (higher osmotic pressure) solution through the membrane. In order to suppress formation of a concentration polarization layer near the membrane, it is necessary to cause the higher concentration (higher osmotic pressure) solution and the lower concentration (lower osmotic pressure) solution to flow over both surfaces of the membrane.

For example, in order to form a liquid flow on one of the surfaces of the membrane, the spiral-wound forward osmosis membrane element of Patent Literature 3 is configured to form a liquid flow from a central tube back to the central tube through a curved flow path in an envelope-like membrane leaf. In this membrane leaf, two curved flow paths are provided in parallel in the axial direction of the central tube.

CITATION LIST

Patent Literature

Patent Literature 1: JP 2005-279540 A
Patent Literature 2: JP 2003-176775 A
Patent Literature 3: U.S. Pat. No. 4,033,878 A

SUMMARY OF INVENTION

Technical Problem

However, in such a spiral-wound forward osmosis membrane element in which the liquid fed to the central tube is caused to flow through all of the curved flow paths from one after another, as described in Patent Literature 3, the pressure loss of the flow of the liquid in the central tube and that in the internal flow paths in the membrane leaf increase significantly.

Under these circumstances, it is an object of the present invention to provide a spiral-wound forward osmosis membrane element in which the pressure loss of the flow of a liquid fed to a central tube is reduced.

Solution to Problem

In order to achieve the above object, the present invention provides a spiral-wound forward osmosis membrane element including: a membrane leaf in which a U-shaped internal flow path extending from a first opening to a second opening is formed; and a central tube around which the membrane leaf is wound and which has a feed hole communicating with the first opening and a collection hole communicating with the second opening. The central tube has an interior partitioned to include an inflow region communicating with the feed hole and an outflow region communicating with the collection hole so that the inflow region and the outflow region each form a flow path extending continuously in an axial direction of the central tube from one end to the other end of the central tube.

The present invention also provides a forward osmosis membrane module including: a pressure container; and the spiral-wound forward osmosis membrane element which is loaded in the pressure container.

Advantageous Effects of Invention

According to the above-described configuration, a liquid fed into the inflow region of the central tube flows from the inflow region into the internal flow path of the membrane leaf through the feed hole and the first opening, flows from the internal flow path into the outflow region through the second opening and the collection hole, and then is discharged to the outside. Since the liquid fed into the central tube is discharged to the outside without passing through two or more internal flow paths, the pressure loss of the liquid flow in the central tube and that in the membrane leaf can be reduced, as compared with the case where the liquid fed into the central tube passes through two or more internal flow paths as in the case of Patent Literature 3.

DESCRIPTION OF EMBODIMENTS

Hereinafter, embodiments of the present invention are described with reference to the drawings. The following description is merely exemplary in nature and is not intended to limit the present invention in any way.

First Embodiment

Figure 1:
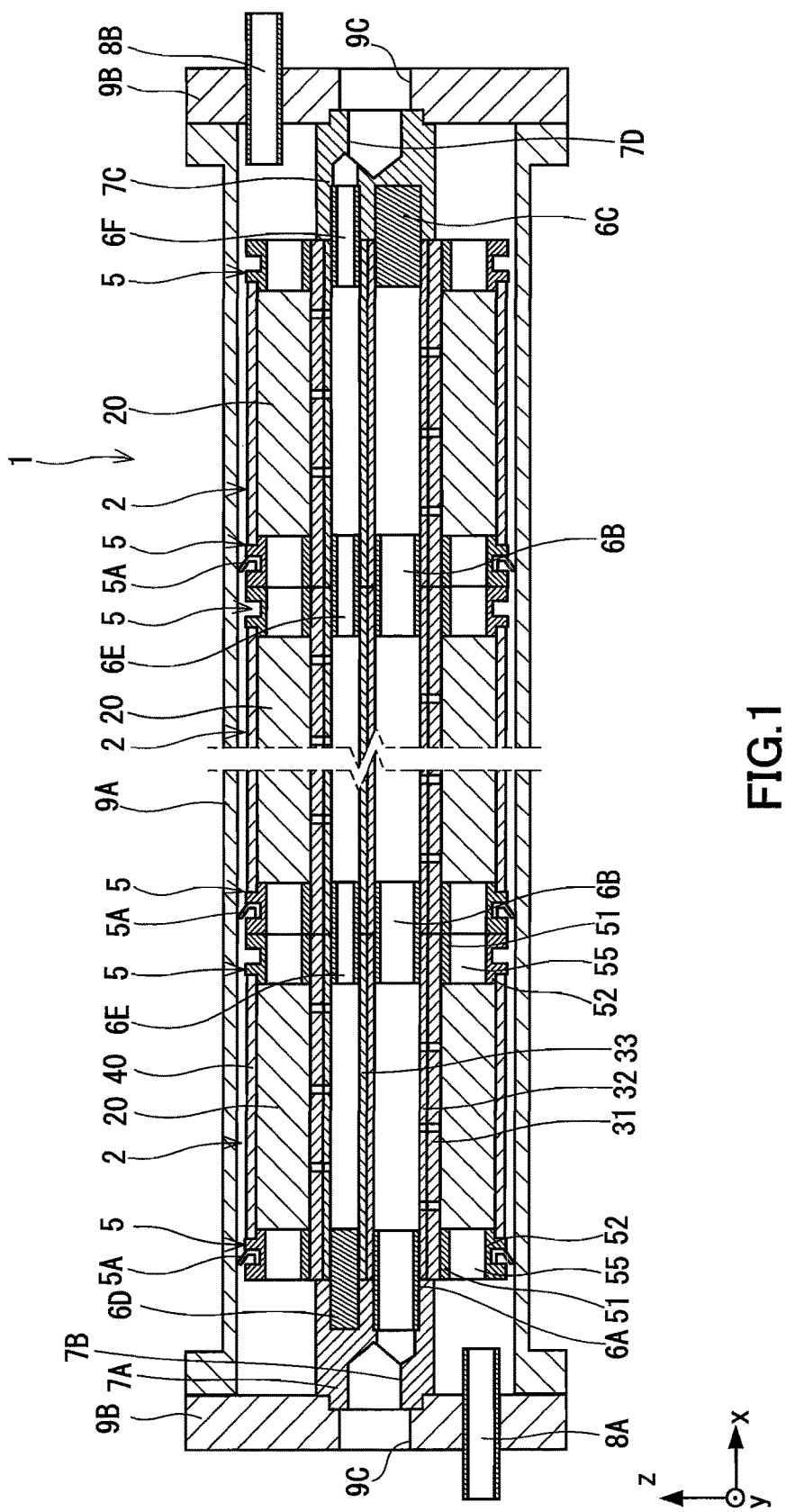
FIG. 1 is a cross-sectional view of a forward osmosis membrane module loaded with a spiral-wound forward osmosis membrane element according to a first embodiment.

FIG. 1 shows a forward osmosis membrane module 1 including spiral-wound forward osmosis membrane elements 2 according to a first embodiment of the present invention. This forward osmosis membrane module 1 includes a tubular pressure container 9A called a vessel and a plurality of spiral-wound forward osmosis membrane elements 2 loaded in the pressure container 9A. Disc-shaped caps 9B are attached to both ends of the pressure container 9A.

A central through hole 9C is formed in the center of one of the caps 9B (on the left side in FIG. 1), and a central feed member 7A is attached to the central through hole 9C on its pressure container 9A side. An inlet port 7B is formed in the central feed member 7A. In the cap 9B, a peripheral feed member 8A is provided at a position away from the center of the cap 9B.

A central through hole 9C is also formed in the center of the other cap 9B (on the right side in FIG. 1), and a central discharge member 7C is attached to the central through hole 9C on its pressure container 9A side. An outlet port 7D is formed in the central discharge member 7C. In the cap 9B, a peripheral discharge member 8B is provided at a position away from the center of the cap 9B.

The spiral-wound forward osmosis membrane elements 2 loaded in the pressure container 9A each have a feed tube 32 and a collection tube 33 to be described later, and the feed tubes 32 of adjacent spiral-wound forward osmosis membrane elements 2 are connected to each other by a connector 6B and the collection tubes 33 thereof are connected to each other by a connector 6E. The spiral-wound forward osmosis membrane element 2 located at one end (on the left side in FIG. 1) is connected to the central feed member 7A by a feed-side connecting member 6A and a plug 6D. The spiral-wound forward osmosis membrane element 2 located at the other end (on the right side in FIG. 1) is connected to the central discharge member 7C by a discharge-side connecting member 6F and a plug 6C.

A first liquid and a second liquid with a higher solute concentration and a higher osmotic pressure than the first liquid are fed to the forward osmosis module 1 of the present embodiment. In the present embodiment, the first liquid fed through the inlet port 7B passes through the central feed member 7A and the feed-side connecting member 6A, flows into one spiral-wound forward osmosis membrane element 2, and flows through the connected spiral-wound forward osmosis membrane elements 2. Then, the first liquid passes through the discharge-side connecting member 6F and the central discharge member 7C, and is discharged to the outside of the forward osmosis membrane module 1 through the outlet port 7D. The first liquid is concentrated by passing through an inner region in the connected spiral-wound forward osmosis membrane elements 2.

On the other hand, the second liquid is fed into the pressure container 9A through the peripheral feed member 8A. The second liquid fed into the pressure container 9A flows through the connected spiral-wound forward osmosis membrane elements 2 in parallel with the flow of the first liquid through the spiral-wound forward osmosis membrane elements 2. Then, the second liquid leaves the spiral-wound forward osmosis membrane element 2 and is discharged to the outside of the pressure container 9A through the peripheral discharge tube 8B. The second liquid is diluted by passing through an inner region in the connected spiral-wound forward osmosis membrane elements 2. In the present embodiment, it can be understood that the first liquid is a liquid to be concentrated and the second liquid is a liquid to be diluted.

The first liquid and the second liquid flow in parallel over both surfaces of a later-described forward osmosis membrane 21 in the spiral-wound forward osmosis membrane element 2. Since the osmotic pressure of the second liquid is higher than that of the first liquid, the liquid moves from the first liquid to the second liquid through the forward osmosis membrane 21 by the osmosis phenomenon. As a result, the flow rate of the liquid discharged through the peripheral discharge member 8B becomes higher than the flow rate of the liquid fed through the peripheral feed member 8A.

The first liquid and the second liquid are caused to flow in parallel over the surfaces of the forward osmosis membrane 21 to prevent the concentration polarization layer from growing near the forward osmosis membrane 21, resulting in a significant decrease in the movement of the liquid from the first liquid to the second liquid by the osmosis phenomenon.

For example, freshwater is used as the first liquid, and seawater is used as the second liquid. However, the first liquid and the second liquid are not limited to these. Raw seawater may be used as the first liquid, and concentrated seawater with a higher concentration than the raw seawater may be used as the second liquid. This means that the osmotic pressure of the first liquid and that of the second liquid needs to be different from each other. The first liquid to be concentrated may also be a liquid, like freshwater, that contains little solute and therefore is not substantially concentrated.

In the present embodiment, the second liquid is fed under a predetermined pressure. This osmosis process in which a liquid to be diluted is fed under pressure is called PRO (pressure retarded osmosis). It is also possible to employ another osmosis process in which an unpressurized first liquid and an unpressurized second liquid to be diluted are fed. In the present invention, these processes are collectively referred to as "forward osmosis", and membranes used for these purposes are referred to as "forward osmosis membranes".

Next, the configuration of the spiral-wound forward osmosis membrane element 2 is described in detail with reference to FIG. 1 to FIG. 3. The x direction, the y direction, and the z direction of the coordinate axes in these figures are intended to indicate the same directions for the spiral-wound forward osmosis membrane element 2 and the forward osmosis membrane module 1 in any figure.

Each of the spiral-wound forward osmosis membrane elements 2 has a central tube 31, a layered body 20 wound around the central tube 31, and an outer covering material 40 covering the layered body 20. End members 5 are attached to both ends of the central tube 31 so as to interpose the layered body 20 therebetween. The outer covering material 40 is held by the end members 5 on both sides. The end members 5 serve to prevent the layered body 20 wound around the central tube 31 from extending telescopically.

Each of the end members 5 has a tubular inner annular portion 51 fitted on the central tube 31, and a tubular outer annular portion 52 disposed concentrically with the inner annular portion 51 and surrounding the inner annular portion 51 at a distance from the inner annular portion 51. The inner annular portion 51 and the outer annular portion 52 are connected together by a connector (not shown). A communication path 55 is formed between the outer peripheral surface of the inner annular portion 51 and the inner peripheral surface of the outer annular portion 52 so that the liquid can pass therethrough. In the present embodiment, the end member 5 on the downstream side of one spiral-wound forward osmosis membrane element 2 is in contact with the end member 5 on the upstream side of the adjacent membrane element 2, and the communication paths 55 of these adjacent end members 5 communicate with each other.

Figure 2A:
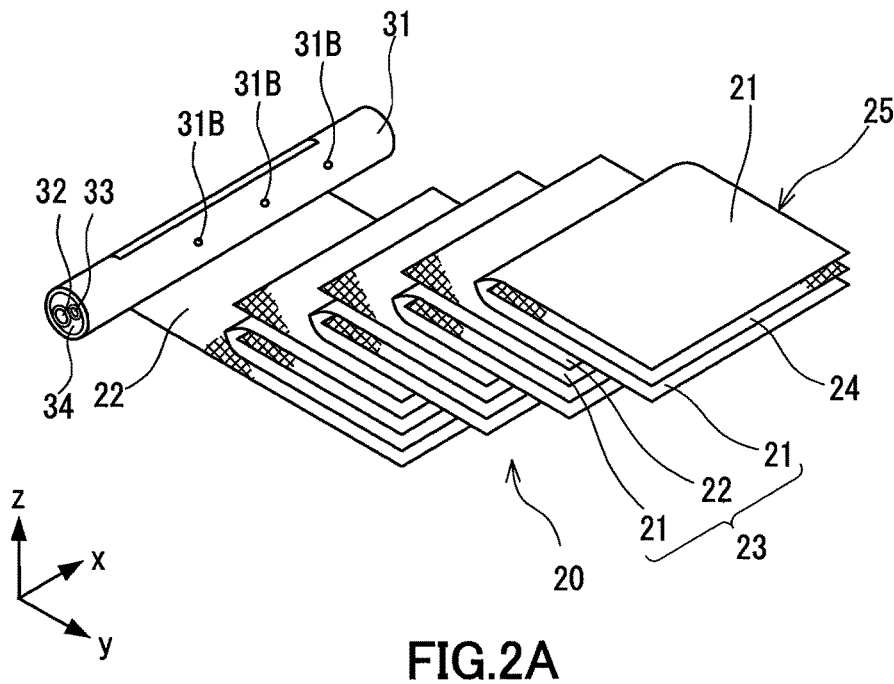
FIG. 2A is a perspective view of a layered body which has not yet been wound around a central tube.
Figure 2B:
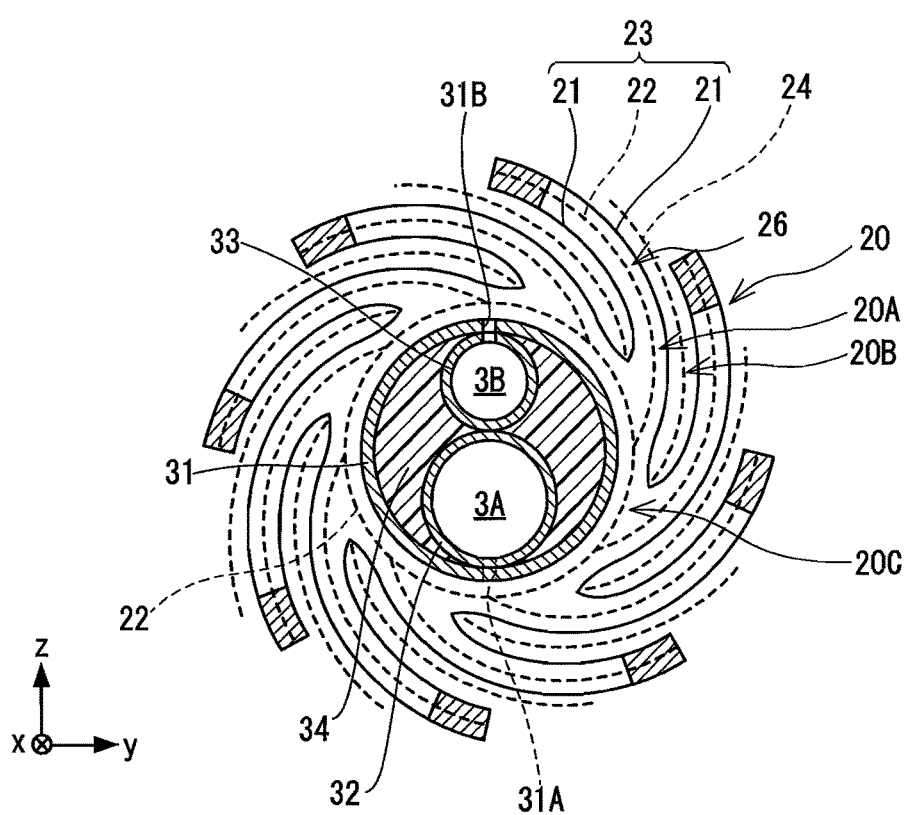
FIG. 2B is a schematic cross-sectional view of a spiral-wound forward osmosis membrane element in which the layered body has been wound around the central tube.

As shown in FIG. 2A and FIG. 2B, the central tube 31 has, in its interior, a feed tube 32 and a collection tube 33 that are arranged so that their outer peripheral surfaces are in contact with each other. Furthermore, the feed tube 32 and the collection tube 33 are arranged in the central tube 31 so that the outer peripheral surface of the feed tube 32 and the outer peripheral surface of the collection tube 33 are in contact with the inner peripheral surface of the central tube 31 in the direction in which the feed tube 32 and the collection tube 33 are arranged.

Spaces are left between the inner peripheral surface of the central tube 31 and the outer peripheral surfaces of the feed tube 32 and the collection tube 33, except at positions where each of the central tube 31, the feed tube 32, and the collection tube 33 is in contact with the other of them. These spaces are filled with a resin, and thereby the feed tube 32 and the collection tube 33 are held in the central tube 31. The filled resin forms sealed portions 34. Since these spaces are filled with the resin, it is possible to prevent the liquid in an inflow region 3A and an outflow region 3B from leaking through a through hole 32A and a through hole 33A into the spaces between the inner peripheral surface of the central tube 31 and the outer peripheral surfaces of the feed tube 32 and the collection tube 33.

A two-component thermosetting resin, a one-component thermosetting resin, a molten thermoplastic resin, etc. can be used to fill the spaces. In view of the work efficiency in the step of forming the sealed portions 34, it is preferable to use a two-component thermosetting resin to fill the spaces. According to the present embodiment, since the outer peripheral surfaces of the feed tube 32 and the collection tube 33 are almost covered with the sealed portions 34, these feed tube 32 and collection tube 33 are firmly held in the central tube 31.

Figure 3:
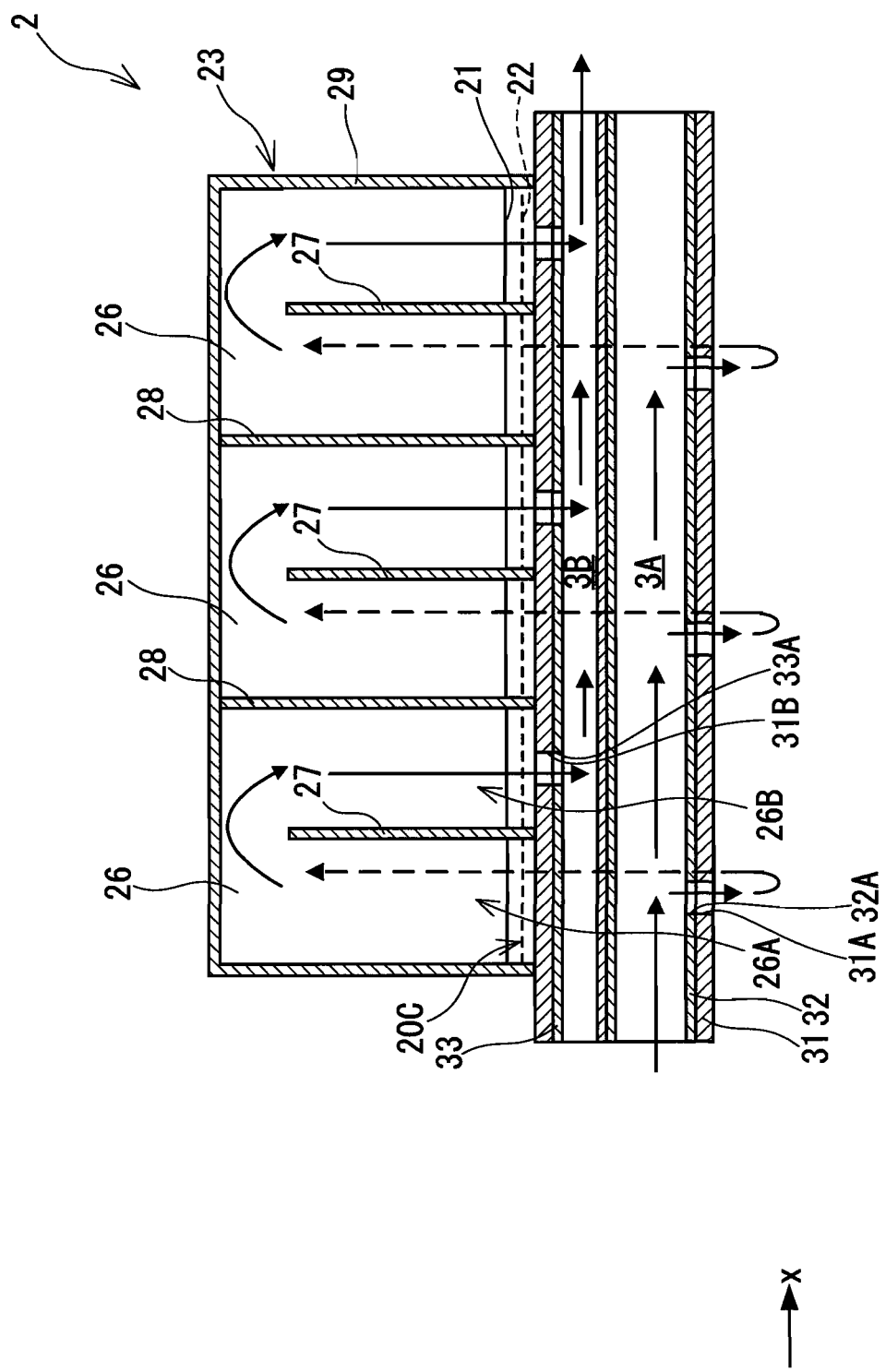
FIG. 3 is a diagram schematically showing a flow of a liquid in a central tube and that in internal flow paths of a membrane leaf according to the first embodiment.

As shown in FIG. 2A, FIG. 2B, and FIG. 3, a plurality of feed holes 31A and a plurality of collection holes 31B are formed in the wall of the central tube 31 so that a line of feed holes 31A and a line of collection holes 31B each extend in the axial direction (x-axis direction) of the central tube 31. The positions of the plurality of feed holes 31A are different from those of the plurality of collection holes 31B in the x-axis direction.

As shown in FIG. 2B, the inner peripheral surface of the feed tube 32 defines the inflow region 3A, and the inner peripheral surface of the collection tube 33 defines the outflow region 3B. As shown in FIG. 3, the inflow region 3A and the outflow region 3B each extend continuously in the axial direction (x-axis direction) of the central tube 31 from one end to the other end thereof. The inflow region 3A and the outflow region 3B, which are described later in detail, each form a flow path of the first liquid. The feed tube 32 has the through hole 32A communicating with the feed hole 31A of the central tube 31, and the collection tube 33 has the through hole 33A communicating with the collection hole 31B of the central tube 31.

As shown in FIG. 2A and FIG. 2B, the layered body 20 has a configuration in which outer flow path materials 24 and envelope-like membrane leaves 23, each of which is composed of an inner flow path material 22 and forward osmosis membranes 21 placed on both sides of the inner flow path material 22, are alternately stacked. The inner flow path material 22 is, for example, a net made of a resin, and forms an inner flow path 20A for allowing the first liquid to flow between the forward osmosis membranes 21. The outer flow path material 24 is, for example, a net made of a resin, and forms an outer flow path 20B for allowing the second liquid with a higher osmotic pressure than the first liquid to flow between the membrane leaves 23. In the forward osmosis membrane element 2 of the present embodiment, the second liquid is fed under pressure. Therefore, it is preferable to use a relatively fine-meshed net as the inner flow path material 22 in order to prevent a close contact between the forward osmosis membranes 21. On the other hand, the outer flow path material 24 is a net with a coarser mesh than the inner flow path material 22.

For example, two forward osmosis membranes 21 are formed by folding a single continuous sheet 25 into two with the outer flow path material 24 interposed therebetween. The forward osmosis membranes 21 thus formed are bonded together along three sides thereof with the inner flow path material 22 interposed therebetween. Thus, the membrane leaf 23 is obtained. An adhesive is used for this bonding. For example, one of the inner flow path materials 22 is elongated, the elongated portion is directly wound around the central tube 31, and both ends of the elongated portion are sealed with an adhesive. Thus, a tubular flow path 20C is formed around the outer peripheral surface of the central tube 31.

The configuration of the layered body 20 is not limited to that shown in FIG. 2A and FIG. 2B. For example, all the forward osmosis membranes 21 may be connected into a single accordion-folded continuous sheet.

As the forward osmosis membrane 21, for example, a composite membrane composed of a porous support and a skin layer formed thereon can be used. As the porous support, a porous epoxy resin membrane can be used. As the skin layer formed on the porous support, a skin layer containing a polyamide resin obtained by polymerizing a polyfunctional amine component and a polyfunctional acid halide component can be used.

The method for forming a skin layer containing a polyamide resin on the surface of a porous epoxy resin membrane is not particularly limited, and any known method can be used. For example, methods such as interfacial condensation, phase separation, and thin film coating can be used. For example, it is possible to form a skin layer by bringing an aqueous amine solution containing a polyfunctional amine component into contact with an organic solution containing a polyfunctional acid halide component and place the skin layer on a porous epoxy resin membrane. Examples of the polyfunctional amine component include aromatic, aliphatic, and alicyclic polyfunctional amines. These polyfunctional amine components may be used alone or as a mixture thereof. An aromatic, aliphatic, or alicyclic polyfunctional acid halide can be used as the polyfunctional acid halide component. These polyfunctional acid halide components may be used alone, but they may be used as a mixture thereof.

As the constituent material of the porous support, a material other than those mentioned above can be used. Examples of the material include polyarylethersulfones such as polysulfone and polyethersulfone, polyimides, and polyvinylidene fluorides.

As the constituent material of the skin layer, a material other than those mentioned above can be used. Examples of the material include polyethylene (PE), polypropylene (PP), polyethylene terephthalate (PET), nylon, polyacrylonitrile (PAN), polyvinyl alcohol (PVA), PMMA, polysulfone, polyethersulfone, polyimide, and ethylene-vinyl alcohol copolymer.

The interior of the central tube 31 and the interior of the membrane leaf 23 are described in detail with reference to FIG. 3. FIG. 3 is a cross-sectional view showing schematically the flow of the liquid in the central tube 31 and that in the membrane leaf 23. For the sake of simplification, only one membrane leaf 23 is shown in this figure.

In the membrane leaf 23, two forward osmosis membranes 21 are bonded together along the three sides thereof by a bonding portion 29 made of the adhesive mentioned above, and thereby a space is defined between the membranes 21. This space is partitioned by bonding portions 28 made of an adhesive, for example, and extending from the side on which the bonding portion 29 is not formed to the opposite side so as to bond the two forward osmosis membranes 21 along the bonding portions 28. Thus, three internal flow paths 26 that are arranged in the axial direction of the central tube 31 are formed. Each of the internal flow path 26 is partitioned by a bonding portion 27 made of an adhesive, for example, and extending from the side on which the bonding portion 29 is not formed toward the opposite side so as to bond the two forward osmosis membranes 21 along the bonding portion 27, with a space left between the bonding portion 27 and the bonding portion 29.

These bonding portions 27 to 29 form each of the internal flow paths 26 as a U-shaped flow path having a first opening 26A and a second opening 26B that are formed at one end of the membrane leaf 23 (the end at which the bonding portion 29 is not formed) and extending from the first opening 26A to the second opening 26B. In one membrane leaf 23, all the internal flow paths 26 are arranged in parallel in the axial direction (x-axis direction) of the central tube 31, and the first openings 26A and the second openings 26B of these internal flow paths 26 are alternately arranged in the axial direction (x-axis direction) of the central tube 31.

The bonding portions 27 to 29 extend to the outer peripheral surface of the central tube 31, and the forward osmosis membranes 21 are bonded to the outer peripheral surface of the central tube 31, with the inner flow path material 22 forming the tubular flow path 20C interposed therebetween. By these bonding portions, the tubular flow path 20C is partitioned in the axial direction of the central tube 31, there is a partition at the boundary between the first opening 26A and the second opening 26B in each of the internal flow paths 26, and the internal flow paths 26 that are adjacent to each other in the axial direction (x-axis direction) of the central tube 31 are separated from each other.

The inflow region 3A communicates with the first opening 26A through the through hole 32A, the feed hole 31A, and the tubular flow path 20C. The outflow region 3B communicates with the second opening 26B through the through hole 33A, the collection hole 31B, and the tubular flow path 20C. Actually, the first opening 26A communicates with a plurality of through holes 32A and a plurality of feed holes 31A, and the second opening 26B communicates with a plurality of through holes 33A and a plurality of collection holes 31B, but only one hole of each set of holes is shown in FIG. 3 for the sake of simplification.

Next, the flow of the first liquid in the central tube 31 and that in the internal flow paths 26 of the membrane leaf 23 are described with reference to FIG. 3.

In FIG. 3, arrows schematically indicate the flow of the first liquid in the spiral-wound forward osmosis membrane element 2. The first liquid fed into the forward osmosis membrane module 1 flows into the feed tube 32 through the inlet port 7B or through the upstream-side spiral-wound forward osmosis membrane element 2 in some cases, and flows in the inflow region 3A.

The first liquid flowing in the inflow region 3A passes through the through hole 32A, the feed hole 31A, and the tubular flow path 20C, and then flows into the internal flow path 26 through the first opening 26A and flows in the internal flow path 26. The second liquid (a liquid having a higher osmotic pressure than the first liquid) fed from the peripheral feed member 8A flows outside the membrane leaf 23, and thus the first liquid and the second liquid flow over both surfaces of the membrane leaf 23. Therefore, a portion of the first liquid flowing in the internal flow path 26 moves to the outside of the membrane leaf 23 across the forward osmosis membrane 21 by the osmosis phenomenon. The rest of the first liquid that has not moved to the outside of the membrane leaf 23 from the upstream-side internal flow path 26 leaves the internal flow path 26 through the second opening 26B, passes through the tubular flow path 20C, the collection hole 31B, and the through hole 33A, and then flows into the outflow region 3B. In the case where the first liquid contains a solute component, the concentration of the first liquid is higher when it flows into the outflow region 3B than when it has flowed into the inflow region 3A.

The first liquid that has flowed into the outflow region 3B flows in the outflow region 3B of the downstream-side spiral-wound forward osmosis membrane element 2 in some cases, and then is discharged from the forward osmosis membrane module 1 through the outlet port 7D.

As shown in FIG. 1, in the forward osmosis module 1, the other end of the feed tube 32 of the spiral-wound forward osmosis membrane element 2 located on the most downstream side is sealed with a plug 6C. Therefore, the first liquid fed into the forward osmosis membrane module 1 flows in any of the internal flow paths 26 of the spiral-wound forward osmosis membrane element 2 and then is discharged from the forward osmosis membrane module 1. Once the first liquid in the inflow region 3A flows into the outflow region 3B after flowing through the internal flow path 26, the first liquid in the outflow region 3B is discharged to the outside without flowing into another internal flow path 26.

That is, the first liquid fed into the inflow region 3A is discharged to the outside without passing through two or more internal flow paths 26. Therefore, in the spiral-wound forward osmosis membrane element of the present embodiment, the pressure loss of the liquid flow in the central tube and that in the membrane leaf can be reduced, as compared with a conventional spiral-wound forward osmosis membrane element in which a liquid fed into the element passes through two internal flow paths from one after another.

In the present embodiment, the cross-sectional area of the flow path formed by the inflow region 3A is constant from one end to the other end of the central tube 31, and the cross-sectional area of the flow path formed by the inflow region 3B is also constant. Thereby, it is possible to suppress an increase in the pressure loss caused by the axial variation of the cross-sectional area of the flow path formed by the inflow region 3A or the cross-sectional area of the flow path formed by the outflow region 3B.

In the present embodiment, the cross-sectional area of the flow path formed by the inflow region 3A is larger than that of the flow path formed by the inflow region 3B. In the internal flow path 26, a portion of the first liquid moves to the outside of the membrane leaf 23 across the forward osmosis membrane 21. Therefore, the flow rate of the first liquid flowing in the flow path formed by the outflow region 3B is lower than that of the first liquid flowing in the flow path formed by the inflow region 3A. When the flow path formed by the inflow region 3A and the flow path formed by the outflow region 3B are configured as described above, it is possible to feed more first liquid to the flow path formed by the inflow region 3A and to increase the efficiency of using the flow path formed by the outflow region 3B.

It is preferable to adjust the ratio Sa/Sb between the cross-sectional area Sa of the flow path formed by the inflow region 3A and the cross-sectional area Sb of the flow path formed by the outflow region 3B so as to achieve a good balance between the amount of the first liquid fed to the spiral-wound forward osmosis membrane element and the amount of the first liquid discharged therefrom and to achieve efficient forward osmosis processes.

(Modifications)

Modifications are described with reference to FIG. 4 to FIG. 6. FIG. 4 to FIG. 6 each show a cross-sectional view of the zy plane of a central tube 31 of a spiral-wound forward osmosis membrane element 2 according to a modification. The spiral-wound forward osmosis membranes 2 according to the modifications are configured in the same manner as the spiral-wound forward osmosis membrane element 2 of the first embodiment, except that their central tubes 31 are different in structure.

(First Modification)

Figure 4A:
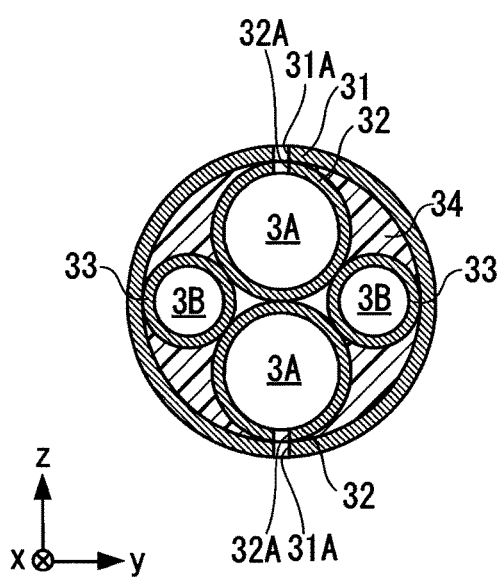
FIG. 4A and FIG. 4B are each a cross-sectional view of a central tube according to a first modification.
Figure 4B:
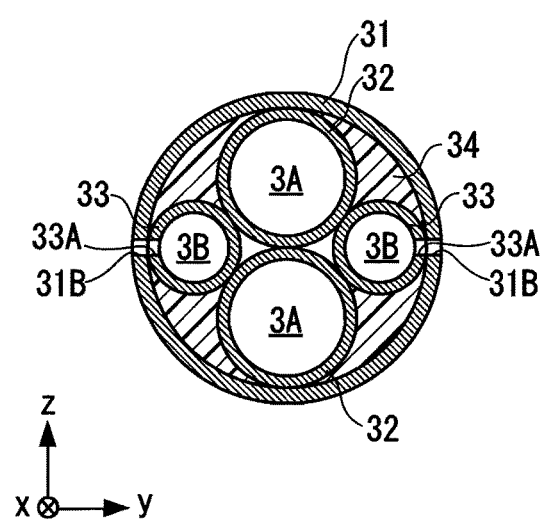

FIG. 4A and FIG. 4B are each a cross-sectional view showing the internal structure of a central tube 31 according to a first modification. In the first modification, two feed tubes 32 having the same diameter are arranged adjacent to each other in the central tube 31 so that their outer peripheral surfaces are in contact with the inner peripheral surface of the central tube 31. Two collection tubes 33 having the same diameter are arranged so that their outer peripheral surfaces are in contact with the inner peripheral surface of the central tube 31 and the outer peripheral surfaces of the two feed tubes 32. Four spaces are present between the inner peripheral surface of the central tube 31 and the outer peripheral surfaces of the two feed tubes 32 and the outer peripheral surfaces of the two collection tubes 33, that is, on the side closer to the inner peripheral surface of the central tube 31 than the positions where the outer peripheral surfaces of the feed tubes 32 and the outer peripheral surfaces of the collection tubes 33 are in contact with each other. These four spaces are filled with a resin so as to form sealed portions 34. The diameter of the feed tube 32 is larger than that of the collection tube 33, and the cross-sectional area of the flow path formed by the inflow region 3A is larger than that of the flow path formed by the outflow region 3B.

The two feed tubes 32 and the two collection tubes 33 are arranged alternately in the circumferential direction. Accordingly to this arrangement, two feed holes 31A, two through holes 32A, two collection holes 31B, and two through holes 33A are provided in the circumferential direction of the central tube 31. Therefore, it is possible to feed the first liquid from the inflow region 3A into the internal flow path 26 and to return the first liquid from the internal flow path 26 into the outflow region 3B at a plurality of positions in the circumferential direction of the central tube 31. Thereby, it is possible to feed the first liquid more evenly to the plurality of membrane leaves 23 wound around the central tube 31.

Furthermore, in the first modification, the volume of the spaces between the inner peripheral surface of the central tube 31 and the outer peripheral surfaces of the feed tubes 32 and the collection tubes 33 can be reduced, as compared with the first embodiment. Therefore, it is possible to provide a larger volume for the inflow regions 3A and the outflow regions 3B and thus to improve the performance of the spiral-wound forward osmosis membrane element. In addition, it is possible to reduce the amount of the resin filled in the spaces between the inner peripheral surface of the central tube 31 and the outer peripheral surfaces of the feed tubes 32 and the collection tubes 33, as compared with the first embodiment.

(Second Modification)

Figure 5A:
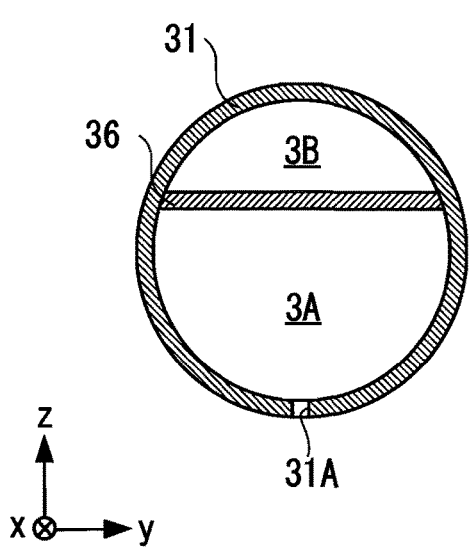
FIG. 5A and FIG. 5B are each a cross-sectional view of a central tube according to a second modification.
Figure 5B:
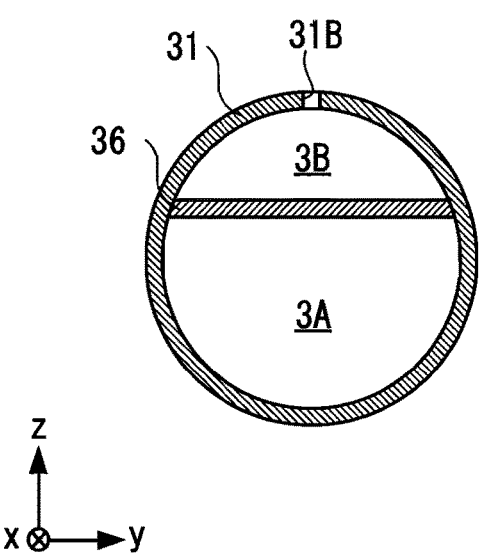

FIG. 5A and FIG. 5B are each a cross-sectional view showing the internal structure of a central tube 31 according to a second modification. This central tube 31 has, in its interior, a partition portion 36 extending continuously from one end to the other end of the central tube 31, and the interior is partitioned into the inflow region 3A and the outflow region 3B by the inner peripheral surface of the central tube 31 and the partition portion 36. The length of the partition portion 36 in the y axis direction is shorter than the inner diameter of the central tube 31. Therefore, the cross-sectional area of the flow path formed by the inflow region 3A is larger than that of the flow path formed by the outflow region 3B. Through holes are formed in the wall of the central tube 31 to communicate the inflow region 3A and the outflow region 3B with the outside of the central tube 31, and these through holes serve as the feed holes 31A and the collection holes 31B.

The central tube 31 having the partition portion 36 can be produced by extrusion molding or injection molding. The central tube 31 can also be produced by joining a plate-like member serving as the partition portion 36 to the inner peripheral surface of the central tube 36 by heat welding, ultrasonic welding, welding, bonding, or the like. Alternatively, the central tube 31 can be produced by joining two tubes with a semicircular cross section.

The second modification eliminates the need to fill the interior of the central tube 31 with a resin to form the sealed portion 34. Therefore, it is possible to use a larger volume of the interior of the central tube 31 as the inflow region 3A or the outflow region 3B, and thus to improve the performance of the spiral-wound forward osmosis membrane element.

(Third Modification)

Figure 6A:
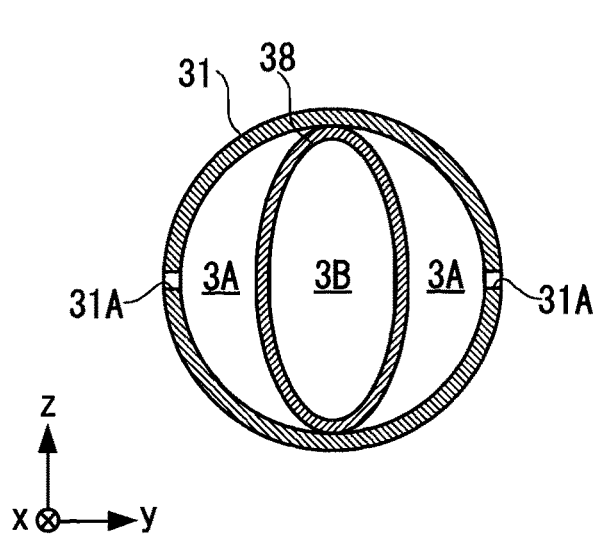
FIG. 6A and FIG. 6B are each a cross-sectional view of a central tube according to a third modification.
Figure 6B:
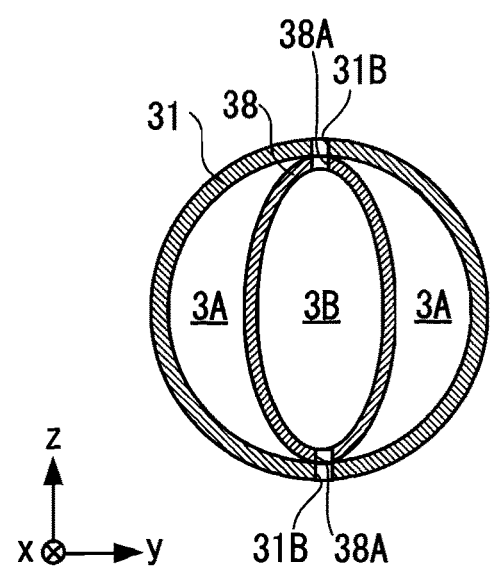

FIG. 6A and FIG. 6B are each a cross-sectional view showing the internal structure of a central tube 31 according to a third modification. In the third modification, an inner tube 38 having an elliptical cross section is fixed in the central tube 31. The outer diameter of the inner tube 38 in the longitudinal direction is almost equal to the inner diameter of the central tube 31, and the inner tube 38 is placed in contact with the inner peripheral surface of the central tube 31 in the longitudinal direction. The inflow regions 3A are defined by the inner peripheral surface of the central tube 31 and the outer peripheral surface of the inner tube 38, and the outflow region 3B is defined by the inner peripheral surface of the inner tube 38. A plurality of collection holes 31B are formed in the wall of the central tube 31 at positions corresponding to the opposite ends of the longer axis of the cross section of the inner tube 38. A plurality of through holes 38A communicating with the plurality of collection holes 31B are formed in the wall of the inner tube 38. The outflow region 3B communicates with the outside of the central tube 31 through the through holes 38A and the collection holes 31B.

In the wall of the central tube 31, feed holes 31A are formed at positions other than the positions where the central tube 31 and the inner tube 38 are in contact with each other (i.e., other than the positions corresponding to the opposite ends of the longer axis of the cross section of the inner tube 38). The inflow regions 3A communicate with the outside of the central tube 31 through the feed holes 31A.

The central tube 31 having the inner tube 38 in its interior can be produced by extrusion molding, injection molding, or the like. The central tube 31 can also be produced by joining the inner peripheral surface of the central tube 31 and the outer peripheral surface of the inner tube 38 by heat welding, ultrasonic welding, welding, bonding, or the like.

According to the third modification, it is possible to use the spaces between the inner peripheral surface of the central tube 31 and the outer peripheral surface of the inner tube 38 as the inflow regions 3A, and thus to improve the performance of the spiral-wound forward osmosis membrane element, as compared with the first embodiment.

In the wall of the central tube 31, the feed holes 31A can be formed at positions other than the positions where the central tube 31 and the inner tube 38 are in contact with each other (i.e., other than the positions corresponding to the opposite ends of the longer axis of the cross section of the inner tube 38). Thereby, it is possible to facilitate feeding the liquid more evenly to the internal flow paths 26 of the membrane leaves 23 wound around the central tube 31 in its circumferential direction.

Other Embodiments

The spiral-wound forward osmosis membrane element and the forward osmosis module of the present invention are not limited in any way to the above-described embodiments, and can be implemented in other embodiments.

Figure 7:
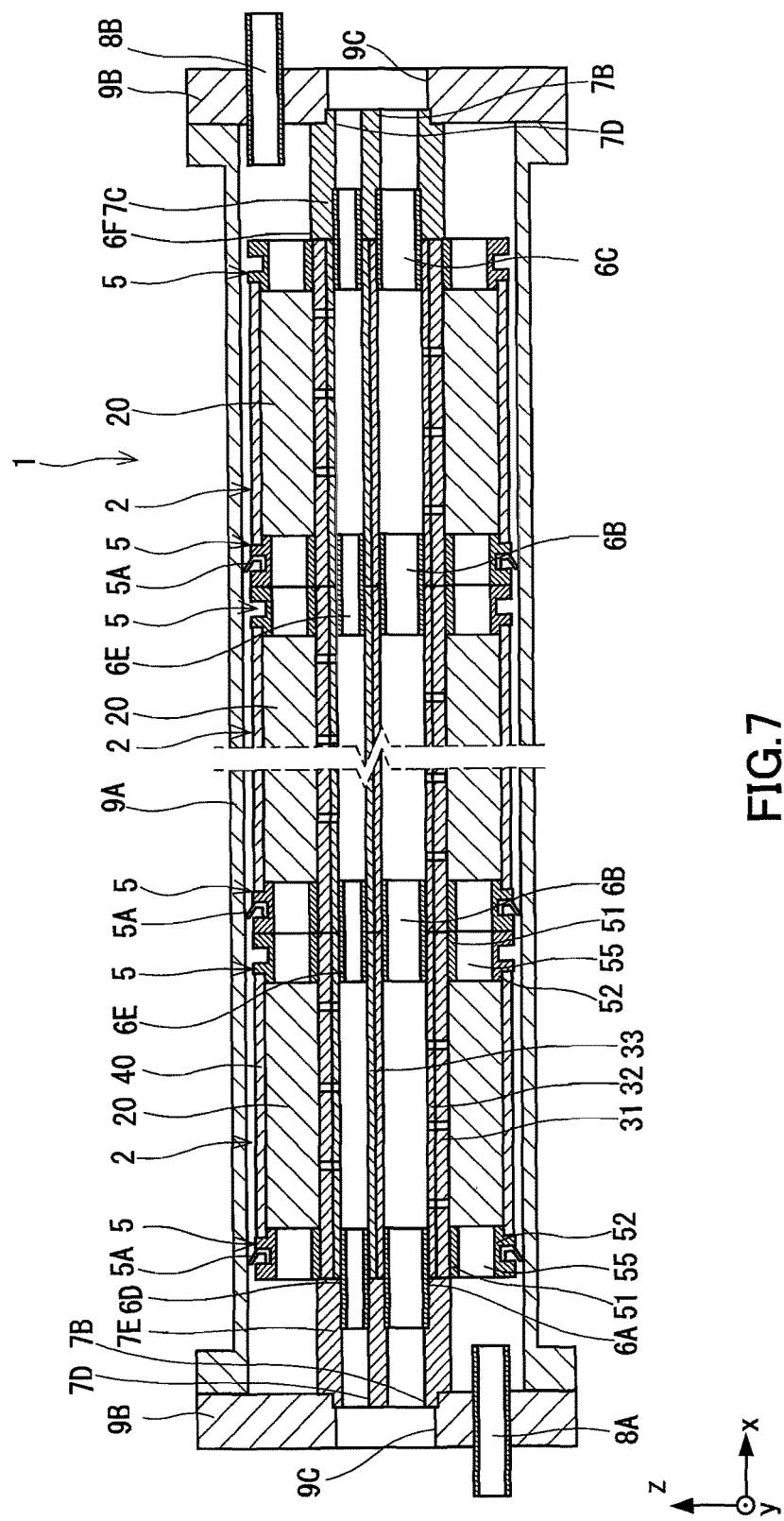
FIG. 7 is a cross-sectional view of a forward osmosis membrane module according to another embodiment.

In the first embodiment, the inlet port 7B is provided at one end of the forward osmosis membrane module 1 (on the left side in FIG. 1). However, as shown in FIG. 7, the inlet ports 7B may be provided at both ends of the forward osmosis membrane module 1 by attaching the flow path members 7E each having the inlet port 7B to the central through holes 9C of the caps 9B on their pressure container 9A side. In this case, if the plug 6C is replaced with the feed-side connecting member 6A, it is possible to feed the first liquid to the inflow regions 3A in the central tubes 31 of the spiral-wound forward osmosis membrane elements 2 from both ends of the forward osmosis membrane module 1. When the first liquid is fed to the inflow regions 3A of the spiral-wound forward osmosis membrane elements 2 from both ends of the forward osmosis membrane module 1, the flow of the first liquid from one end of the forward osmosis membrane module 1 and the flow of the first liquid from the other end of the forward osmosis membrane module collide with each other in any of the inflow regions 3A, and they do not reach the opposite end of the flow path formed by the inflow regions 3A of the connected spiral-wound forward osmosis membrane elements. As a result, the substantial length of the flow path of the first liquid in the central tube 31 is reduced, and the pressure loss of the first liquid flowing in the central tube 31 can be further reduced.

In the forward osmosis membrane module 1 according to the first embodiment, the plurality of spiral-wound forward osmosis membrane elements 2 that are connected together are loaded in the pressure container 9A, but only one spiral-wound forward osmosis membrane element 2 may be loaded in the pressure container 9A. Also in this case, the inlet ports may be provided at both ends of the forward osmosis membrane module 1.

As described in the first embodiment and modifications, it is preferable that the cross-sectional area of the flow path formed by the inflow region 3A be larger than that of the flow path formed by the outflow region 3B. However, the size relationship between the cross-sectional area of the flow path formed by the inflow region 3A and that of the flow path formed by the outflow region 3B is not limited to this relationship. These cross-sectional areas may be equal to each other, or the size relationship between them may be reversed.

As described in the first embodiment, it is preferable that the osmotic pressure of the second liquid be higher than that of the first liquid, but may be lower than that of the first liquid. In this case, a portion of the second liquid moves from the outside of the membrane leaf 23 into the internal flow path 26 of the membrane leaf 23 across the forward osmosis membrane 21. This means that the flow rate in the flow path formed by the outflow region 3B is higher than that in the flow path formed by the inflow region 3A. Therefore, it is preferable that the cross-sectional area of the flow path formed by the outflow region 3B be larger than that of the flow path formed by the inflow region 3A.

In the first embodiment and the modifications, circular or elliptical tubes are used as the central tube and the inner tubes (the feed tube and the collection tube). However, the shape of the central tube and the inner tubes is not limited to this. Rectangular tubes may be used, or tubes having an arbitrary cross-sectional shape may be used. A gasket such as an O-ring is sometimes used to seal between the end portion of the central tube 3 of the spiral-wound forward osmosis membrane element 2 and the central feed member 7A or the central discharge member 7C or between the end portions of the central tubes 3 of the adjacent spiral-wound forward osmosis membrane elements 2. In view of this, it is preferable to use circular or elliptical tubes as the central tube and the inner tubes.

In the first embodiment, the spaces between the inner peripheral surface of the central tube 31 and the outer peripheral surfaces of the feed tube 32 and the collection tube 33 are filled with a resin so as to hold the feed tube 32 and the collection tube 33 in the central tube 31. However, the central tube 31 including the feed tube 32 and the collection tube 33 that are joined together therein may be produced by extrusion molding or the like. This eliminates the need to fill the spaces between the inner peripheral surface of the central tube 31 and the outer peripheral surfaces of the feed tube 32 and the collection tube 33 with a resin to form the sealed portions 34.

In the first embodiment, the width of the open end of the first opening 26 A may be larger than that of the open end of the second opening 26B. This is an easy way to make the opening area of the first opening 26A larger than that of the second opening 26B. A portion of the first liquid flowing in the internal flow path 26 of the membrane leaf 23 moves to the outside of the membrane leaf 23 across the forward osmosis membrane 21 by the osmosis phenomenon. Therefore, the flow rate of the first liquid passing through the second opening 26B is lower than that of the first liquid passing through the first opening 26A. This configuration of the first opening 26A and the second opening 26B makes it easier for these openings 26A and 26B, respectively, to have the opening areas corresponding to the flow rates of the first liquid passing through them.

In the first embodiment, the number of the internal flow paths 3 in one membrane leaf 23 is three, but is not limited to this. The number of the internal flow paths in one membrane leaf may be one, two, or three or more. When the number of the internal flow paths is three or more, the width of each internal flow path in the central tube axis direction is narrower and thus the liquid can be spread to every corner of the internal flow path. As a result, it is possible to increase the efficiency of using the forward osmosis membrane 21. However, if the number of the internal flow paths is too large, the flow path resistance in the internal flow path 26 increases and the area required for the bonding portions 27 and 28 also increases. From the viewpoint of increasing the efficiency of using the forward osmosis membrane 21, the appropriate number of the internal flow paths 26 in one membrane leaf 23 is two to five.

In the first modification, two feed tubes 32 and two collection tubes 33 are fixed in the central tube 31, but the number of the feed tubes 32 to be fixed and the number of the collection tubes 33 to be fixed may each be two or more. The number of the feed tubes 32 and the number of the collection tubes 33 need not necessarily be equal to each other, and at least one of the numbers may be one. As the number of the feed tubes or the collection tubes to be fixed in the central tube 31 increases, the volume of the spaces between the inner peripheral surface of the central tube 31 and the outer peripheral surfaces of the feed tubes 32 and the collection tubes 33 decreases, and thus the inflow regions 3A or the outflow regions 3B having a larger volume can be formed. Furthermore, the inner diameter of the feed tube 32 and the inner diameter of the collection tube 33 may be equal to each other, or the inner diameter of the collection tube 33 may be larger than that of the feed tube 32 in some cases.

DESCRIPTION OF THE REFERENCE NUMERALS

1 Forward osmosis membrane module
2 Spiral-wound forward osmosis membrane element
20 Layered body
21 Forward osmosis membrane
23 Membrane leaf
26 Internal flow path
26A First opening
26B Second opening
31 Central tube
3A Inflow region
3B Outflow region
31A Feed hole
31B Collection hole
32 Feed tube
32A Through hole
33 Collection tube
33A Through hole
34 Sealed portion
36 Partition portion
38 Inner tube
38A Through hole
6A Feed-side connecting member
6B, 6E Connectors
6C, 6D Plugs
6F Discharge-side connecting member
7B Inlet port
7D Outlet port
9A Pressure container

The invention claimed is:

1. A spiral-wound forward osmosis membrane element comprising:
    a membrane leaf in which a U-shaped internal flow path extending from a first opening to a second opening is formed; and
    a central tube around which the membrane leaf is wound and which has a feed hole communicating with the first opening and a collection hole communicating with the second opening, wherein
    the central tube has an interior partitioned to include an inflow region communicating with the feed hole and an outflow region communicating with the collection hole so that the inflow region and the outflow region each form a flow path extending continuously in an axial direction of the central tube from one end to the other end of the central tube, and
    a cross-sectional area of the flow path formed by the inflow region is constant from the one end to the other end of the central tube, and a cross-sectional area of the flow path formed by the outflow region is constant from the one end to the other end of the central tube.

2. The spiral-wound forward osmosis membrane element according to claim 1, wherein a first fluid is fed into the central tube, and a second fluid having a higher osmotic pressure than the first fluid is fed outside the membrane leaf.

3. The spiral-wound forward osmosis membrane element according to claim 1, wherein the cross-sectional area of the flow path formed by the inflow region is larger than the cross-sectional area of the flow path formed by the outflow region.

4. The spiral-wound forward osmosis membrane element according to claim 3, wherein a width of an open end of the first opening is larger than a width of an open end of the second opening.

5. The spiral-wound forward osmosis membrane element according to claim 1, wherein in the membrane leaf, the internal flow paths are arranged in the axial direction of the central tube.

6. The spiral-wound forward osmosis membrane element according to claim 1, further comprising:
    a feed tube that is placed in the central tube to define the inflow region and has a through hole communicating with the feed hole; and
    a collection tube that is placed in the central tube to define the outflow region and has a through hole communicating with the collection hole.

7. The spiral-wound forward osmosis membrane element according to claim 6, wherein a space between an inner peripheral surface of the central tube and outer peripheral surfaces of the feed tube and the collection tube is filled with a resin.

8. The spiral-wound forward osmosis membrane element according to claim 6, wherein a plurality of the feed tubes and a plurality of the collection tubes are present and the plurality of feed tubes and the plurality of collection tubes are placed in the central tube.

9. The spiral-wound forward osmosis membrane element according to claim 1, wherein the central tube has, in its interior, a partition portion extending continuously from one end to the other end of the central tube, and the interior of the central tube is partitioned into the inflow region and the outflow region by the partition portion.

10. A forward osmosis membrane module comprising:
    a pressure container; and
    the spiral-wound forward osmosis membrane element according to claim 1, which is loaded in the pressure container.

11. The forward osmosis membrane module according to claim 10, wherein
- a plurality of the spiral-wound forward osmosis membrane elements are present,
- the plurality of the spiral-wound forward osmosis membrane elements are connected together and are loaded in the pressure container, and
- the forward osmosis membrane module further comprises, at both ends, inlet ports for introducing a liquid into the inflow regions of the spiral-wound forward osmosis membrane elements.

* * * * *